Patented Oct. 7, 1930

1,777,970

UNITED STATES PATENT OFFICE

MAX HARTMANN, OF RIEHEN, NEAR BASEL, SWITZERLAND, ASSIGNOR TO THE FIRM OF SOCIETY OF CHEMICAL INDUSTRY IN BASLE, OF BASEL, SWITZERLAND

CELLULOSE ETHERS AND PROCESS OF MAKING

No Drawing. Application filed August 8, 1929, Serial No. 384,522, and in Switzerland August 31, 1928.

This invention relates to the manufacture of new valuable cellulose derivatives by causing such halogen-alkylamines which contain a halogen atom capable of being exchanged to react with such compounds of cellulose which are capable of reaction with compounds containing halogen atoms capable of being exchanged. These cellulose derivatives are obtained by treating cellulosic material containing free hydroxyl groups, such as cotton, wood pulp, artificial silk, such as viscose silk or cuprammonium silk, acetate silk or other ethers or esters of cellulose compounds containing free hydroxyl groups, with alkali or earth alkali compounds. There are thus obtained basic esters of cellulose. As halogen-alkylamines there may be used these bodies themselves, such as chloroethylamine, chloropropylamine, and the like, or their alkyl or aryl or aralkyl substitution products, such as chloroethyldiethylamine, chloroethylethylaniline, or the like. The halogen derivatives from tertiary amines are particularly valuable products. Instead of the free bases, their hydrochlorides or other salts may be used, particularly in presence of an excess of alkali in the alkali cellulose.

The halogen alkylamines or their salts may be used in aqueous solution, in which case care must be taken that there is a thorough intermixture of the alkali cellulose with the base; or the halogen alkylamines or their salts may be caused to react in presence of a suitable solvent, such as acetone. It is also possible to allow the halogen alkylamines to react in a colloidal solution which consists for example in introducing same into a soap solution or into another solution containing a dispersing agent, such as albumin-solutions, glue, sulfite cellulose waste liquor or the quaternary ammonium bases of mono-acylated diamines. The reaction may occur at ordinary temperature or with application of heat. It is not necessary to start with cellulose alkali compounds which are obtainable from cellulose and concentrated alkalis, but the reaction may be carried out in very dilute alkalis or even in alkaline earths, particularly in the case of such sorts of cellulose which are easily swelled up in weak alkaline solutions, such as viscose silk and cuprammonium silk. Moreover, cellulose esters which still possess free OH-groups may also be converted into basic cellulose derivatives by choosing the quantities of alkalis in such a way that a separation of acyl-groups does not occur or only to a small extent; for example acetate silk threads which contain, as is well known, free hydroxyl groups, can be converted, with preservation of their lustre, by means of chloroethyldiethylamine into basic acetyl cellulose, if the process is performed at ordinary temperature in presence of milk of lime. Reacting components may be used in various proportions. Into 1 mol. of $C_6H_{10}O_5$ 1 to 3 mols. of the chloramine ester may be introduced, so that for instance, one hydroxyl-group of the cellulose corresponds with 1 mol. of chloroalkylamine. However, it is possible to go below the molecular ratio 1:1. By the action of a little chloroalkylamine there is obtained a basic cellulose derivative which has little tendency to swell, whereas by a stronger reaction products are obtained which swell more easily. The basic cellulose-ethers show, as compared with cellulose, an essential variation in properties. For example, they may be quickly and intensely dyed with acid dyestuffs, and also show an enhanced affinity for other dyestuff groups. The invention provides a process for treating cotton in loose form, in skeins or in the web. It also provides a printing process in which, for example, cotton fabric is impregnated with chloroethyldiethylaminehydrochloride solution and, after drying, printed with a strongly alkaline thickening agent. Where the action of the alkali occurs, the basic ether is produced and in dyeing later with an acid dyestuff, for example with tartrazine, these places are strongly dyed. The process can also be applied while the fiber is subjected to stretching. The new basic ethers of cellulose are also useful as parent material for further cellulose derivatives. For instance, they can be further alkylated with, for example, ethyl chloride or they may be acylated, for instance with acetic anhydride, acetyl chloride, toluene sulfochloride or the like in presence or absence of a diluent and a catalyst, the free hydroxyl-groups becoming etherealized, it being understood that this designation comprises not only the formation of so-called etheroxides but also of ether salts (esters). The products thus obtained may be used for making artificial threads.

The products of the invention may be dissolved in the known solvents for cellulose, such as ammoniacal copper oxide, or they may be dissolved in the form of xanthate and from such solutions they can be regenerated by known methods in the form of films or fibers. For example, in a solution of diethylaminoethyl-cellulose in Schweizer's reagent there is obtained by precipitation with dilute sulfuric acid a basic cellulose which is quickly and intensely dyed by means of an acid dyestuff, such as an acid red dyestuff. The products of the invention can also be used as additions in the manufacture of artificial threads from cellulose by dissolving them, together with ordinary cellulose, in the usual solvents for converting them into derivatives of cellulose in intermixture with ordinary cellulose, the products being suitable in making artificial threads.

The following examples illustrate the invention, the parts being by weight:—

Example 1

16 parts of cotton in the form of yarn are immersed in 160 parts of caustic soda solution of 18 per cent strength. After 3 hours, the goods are centrifuged to separate the excess of alkali solution and introduced into a solution of 7 parts of chloroethyldiethylamine in acetone, in which they are frequently handled for 3 hours; they are then washed with water and finally with dilute acetic acid, and then dried.

Example 2

16 parts of cotton yarn are mercerized under tension by means of caustic soda solution of 18 per cent strength. After the excess of solution has been separated the goods are introduced, in a state of tension or not, into an aqueous acetone solution of 9 parts of chloroethyldiethylamine-hydrochloride, and maintained in constant movement, while the temperature is raised to 50–60° C. After 1 hour the excess of solution is drained away and the goods are washed with water until the alkaline reaction disappears. The mercerized cotton thus obtained is dyed by means of acid dyestuffs, such as tartrazine, very intensely and quickly.

Example 3

Cotton fabric is impregnated with a solution of chloroethyldiethylamine-hydrochloride of 5 per cent strength. After drying, the fabric is printed with a thickening containing 20 per cent of caustic soda solution. After the fabric has been left at the ordinary temperature for 12 hours it is washed and dyed with a red acid dyestuff. The printed places are colored intensely dark red.

Example 4

Viscose silk is introduced into caustic soda solution of 20 per cent strength and then treated further as described in Example 1.

Example 5

15 parts of loose cotton are caused to swell in caustic soda solution of 20 per cent strength, then pressed and introduced into a warm solution of 18 parts of chloroethylethylaniline. This is allowed to act for 2 hours, while the goods are kept in movement, whereupon the goods are washed with water until the alkaline reaction has disappeared.

Example 6

15 parts of loose cotton are converted into soda cellulose and, after pressing, subjected to the action of 18 parts of chloroethyldiethylamine-hydrochloride. By the excess of alkali the organic base is liberated, the goods are kneaded for 8 hours and then washed. The diethylamino-ethyl-cellulose thus obtained may be used as such, or may be converted into further cellulose derivatives.

Example 7

15 parts of wood pulp are impregnated for 5 hours with caustic soda solution of 30 per cent strength. After thorough pressing, a solution of 30 parts of chloroethyldiethylamine in acetone is added and the whole is heated for 5 hours at 60° C. There is obtained a mass capable of swelling.

Example 8

10 parts of the diethylamino-ethyl cellulose obtained as described in Example 6 are dissolved in Schweizer's reagent and precipitated in known manner.

Example 9

10 parts of the goods treated as described in Example 6 are dissolved by treatment with caustic soda solution and carbon bisulfide and further worked in known manner.

Example 10

1 part of diethylaminoethyl-cellulose is heated with 2 parts of glacial acetic acid and 4 parts of acetic anhydride in the presence of zinc chloride until the fibrous material has passed into solution. The acetyl product is precipitated by addition of water and further worked up by a known method.

Example 11

10 parts of cellulose and 3 parts of diethylaminoethyl-cellulose are dissolved in Schweizer's reagent and the solution thus obtained is spun by a known method.

Example 12

A bath is prepared containing 1 part of chloroethyldiethylamine dissolved in 10 parts of water, 2 parts of a solution of the quaternary methylsulfate of the mono-oleyldiethylethylenediamine of 10 per cent strength, and 40 parts of milk of lime of 5 per cent strength, whereupon 10 parts of reeled acetate silk are allowed to rotate in this solution for 1 hour at ordinary temperature. The goods are then washed with dilute acetic acid and rinsed with water. The acetate silk thus treated has its lustre preserved and is quickly and intensely dyed with acid dyestuffs.

Example 13

10 parts of cotton yarn are impregnated with a solution containing 1 part of chloroethyldiethylamine, 2 parts of soda soap and 0.5 part of caustic soda in 50 parts of water, and are then hung into streaming steam for 10 minutes. Thereupon the goods are rinsed with dilute acetic acid and water.

Example 14

A solution containing 1 part of chloroethylpiperidino-chlorohydrate in 10 parts of water is mixed with 20 parts of acetone and 5 parts of caustic soda solution of 10 per cent strength and the whole is made up to form a solution of 50 parts by volume. In this solution 10 parts of reeled viscose silk are allowed to rotate and are then rinsed with water after 1 hour.

Example 15

Yarn obtained by the treatment described in Example 1 is dyed, as is usual for wool, with an acid dyestuff with addition of acetic acid or sulfuric acid. According to the choice of dyestuff various tints are obtained, which are characterized by their vividness, and productivity.

Example 16

Yarn treated as described in Example 1 is dyed, as is usual for cotton with a direct dyeing dyestuff, in a neutral bath. According to the choice of the material, various tints are obtained which in general are more intense than those which are obtainable under like conditions on cotton.

Example 17

Cotton fabric treated in accordance with the present invention is printed in known manner with an acid or direct dyeing dyestuff. In both cases the fibre is dyed at the printed places, whereas on ordinary cotton only those places are dyed which have been printed with the direct dyestuffs.

What I claim is:—

1. A manufacture of cellulose derivatives by causing an aliphatic mono-halogen-alkylamine to react with alkali cellulose.

2. A manufacture of cellulose derivatives by causing an aliphatic tertiary mono-halogen-alkylamine to react with alkali cellulose.

3. A manufacture of cellulose derivatives by causing chloro-ethyldiethylamine to react with alkali cellulose.

4. As new cellulose derivatives the new products which are obtained by causing an aliphatic mono-halogen-alkylamine to react with alkali cellulose, which products, in contradistinction to cellulose, contain nitrogen and show a pronounced basic character and can be dyed with acid and substantive dyestuffs.

5. As new cellulose derivatives the new products which are obtained by causing an aliphatic tertiary mono-halogen-alkylamine to react with alkali cellulose, which products, in contradistinction to cellulose, contain nitrogen and show a pronounced basic character and can be dyed with acid and substantive dyestuffs.

6. As new cellulose derivatives the new products which are obtained by causing chloroethyldiethylamine to react with alkali cellulose, which products, in contradistinction to cellulose, contain nitrogen and show a pronounced basic character and can be dyed with acid and substantive dyestuffs.

7. Mixed textile fabrics containing the products of claim 4.

8. Mixed textile fabrics containing the products of claim 5.

9. Mixed textile fabrics containing the products of claim 6.

In witness whereof I have hereunto signed my name this 26th day of July, 1929.

MAX HARTMANN.